UNITED STATES PATENT OFFICE.

ANSIL MOFFATT, OF INDIANAPOLIS, INDIANA.

PROCESS OF MAKING PIGMENTS.

973,374.

Specification of Letters Patent. Patented Oct. 18, 1910.

No Drawing. Application filed December 29, 1909. Serial No. 535,427.

*To all whom it may concern:*

Be it known that I, ANSIL MOFFATT, a citizen of the United States, residing at Indianapolis, in the county of Marion and State of Indiana, have invented certain new and useful Improvements in Processes of Making Pigments, of which the following is a specification.

This invention relates to a process for the production of an improved pigment, and pertains particularly to a process which results in a refined and superior quality of barium sulfate.

The principal object of my invention is to produce an extremely finely subdivided barium sulfate in large quantities and in a very pure state directly from the natural mineral barium sulfate.

It is a further object to reduce barium sulfate as above stated by a process of fusion with a salt which is commercially abundant.

It has long been a well known, but heretofore an impracticable, fact that barium sulfate, when brought into a condition of extremely fine subdivision, may then be cleared from all impurities, as it is the finest imaginable powder, and is not affected by any known acid. It is also well known to those familiar with the art that two classes of pigments, produced by two inadequate and unsatisfactory methods are now derived from natural barium sulfate, otherwise known as "barite," "barytes," "heavy spar," or "tiff." The first method is that which results in what is commercially known as "floated" or "triple floated" barytes, and consists in mechanically pulverizing to as small a subdivision as possible the natural product, and then either sifting or floating in water to collect the finest subdivisions of the powder, after which the latter is bleached and dried and sold in this state. However, the floated barytes thus produced, while possessing a sufficient degree of whiteness, has comparatively no covering power or "body," and is regarded generally as an adulteration. The second commercially used process consists in converting the natural mineral into barium sulfid, by heating with coal or other reducing material, then purifying and precipitating in solution, by some sulfate, generally sodium sulfate. The white precipitate resulting therefrom is barium sulfate (chemically the same as the original barytes), and this precipitate is purified by washing with water. When purified, and separated partly or entirely from the water, for packing in either the wet or dry form as desired, the result is the "blanc fixe," of well known commercial standard. The latter, while being the best barytes pigment on the market, is nevertheless unsatisfactory both as to its covering ability or opacity, and as to its expense of production.

In pursuance of a perfect pigment of barium sulfate, which will have an ideal body as a paint, and which will likewise be cheap, I have expended much time, effort and expense, with the result to be hereinafter set forth and claimed.

Generally speaking, my process of treatment consists in fusing or melting sodium sulfate, or any other suitable salt with barium sulfate, until the latter enters into a complete state of solution or alloy with said salt and thereby becomes extremely finely subdivided. When the fused or melted mixture is cooled the salt, being a soluble one, may be dissolved away from the barium sulfate, which latter being insoluble will remain behind in a state of extreme subdivision, to be prepared for commerce in any form, as requirements dictate.

In the foregoing paragraph, and in the succeeding parts of my specification, I refer to the barium sulfate as being "extremely finely subdivided." This is a term which I use to indicate the extreme subdivision of the barium sulfate which I succeed in producing by my process, in distinguishing it from the ordinary powdered barium sulfate heretofore produced by other methods. The principal evidence of this extreme subdivision is found in the adequate and thorough covering power and complete opacity of my product when used as a paint pigment.

My preferred method of treating barium sulfate is as follows: I take the natural form of barium sulfate (variously known under the names of barite, barytes, heavy spar or tiff) and mix it suitably with sodium sulfate, this being both an economical and efficient solvent for barium sulfate and having a low fusing or melting point. The temperature or point of fusion of the mixture will be high or low according to the proportion of sodium sulfate in the mixture, and the proportion of sodium sulfate is of such quantity that the two sulfates will be in molecular proportion or the alkali sulfate or salt sulfate may be in excess, so that the fused or melted alloy will become homogeneous at an early period. The mixture of barium sulfate and sodium sulfate is heated in an appropriate vessel until fusion occurs, and is maintained in a state of fusion until the alloy or solution is homogeneous or complete. Upon reaching this complete state of alloy, the fused mixture is withdrawn and suitably cooled. The cooling process may be carried on either by pouring the mixture out to cool, or by pouring it into water in a gradual stream. Whichever method is used, the congealed product is then boiled in water to dissolve the salt or alkali sulfate, and to precipitate the barium sulfate. The water thus used, and containing the dissolved alkali sulfate is then removed for other use, preferably to be boiled down to recover the alkali sulfate for future re-use. The precipitate of barium sulfate thus remaining, by reason of its insolubility in water, is the extremely finely subdivided product sought for by my process. As a final step in its production, it is suitably treated by a process of washing and bleaching if desired. It is washed in a water bath, to remove any impurities of a solid nature which may remain, and may be treated with small quantities of acid to remove any coloring impurities. The purified barium sulfate may be drained and dried and suitably packed.

In the process of precipitation, it is possible to combine therewith the cooling step, by introducing the hot alloy in the fused state into the water in a slow manner, thus causing the alloy to be prepared for the boiling and separating process in the same vessel or apparatus in which it is cooled.
While I have specified the use of sodium sulfate as the solvent in the description of my process, it is possible to use any of the common salts to produce a solvent effect on barium sulfate. However, practical experiments of an extended nature have shown sodium sulfate and potassium sulfate to be the most practicable and satisfactory salts.

The result produced by the process above set forth is a pigment of superior quality, especially suitable for use as a paint pigment. Extended experiment has disclosed the fact that a perfect pigment, chemically produced and molecularly subdivided in an exceptionally high degree, may be supplied to enter commerce at a cost approximating $20.00 per ton. This product is derived from the mineral or natural barytes or "tiff," and is the result entirely of the process hereinbefore described. Its cost of production is small, by reason of the comparative simplicity, and ease of installation, of the apparatus necessary, and by reason of the general commercial quantities in which the necessary solvent can be obtained.

It is evident, therefore, that I may produce by my new method a barium sulfate which has a completer "body" or covering power, and which may be produced in quantities more nearly approaching an adequate commercial utility than has heretofore been possible, thereby realizing the object of chemists, artists, and those commercially interested in paint pigments of this character, in long extended efforts.

Having thus fully described my invention, what I claim and desire to secure by Letters Patent of the United States, is:—

1. A process of producing barium sulfate in a state of extremely fine subdivision which consists in fusing natural barium sulfate with an alkaline sulfate, and precipitating the barium sulfate from the alkaline sulfate.

2. A process of producing barium sulfate in an extremely fine state of subdivision, which consists in fusing natural barium sulfate with an alkaline sulfate, cooling the fused mass, and dissolving the alkaline sulfate from the barium sulfate in water.

3. A process of producing barium sulfate in a state of extremely fine subdivision which consists in fusing natural barium sulfate with sodium sulfate, and dissolving the sodium sulfate from the barium sulfate in water.
In testimony whereof I have affixed my signature in presence of two witnesses.

ANSIL MOFFATT.

Witnesses:
 EDWARD A. FORD,
 WILLIAM C. BLISS.